United States Patent
Kuo

(10) Patent No.: US 12,094,329 B2
(45) Date of Patent: Sep. 17, 2024

(54) METHOD AND SYSTEM FOR ADAPTIVELY PROVIDING AUXILIARY DRIVING INFORMATION

(71) Applicant: MiTAC Digital Technology Corporation, Taoyuan (TW)

(72) Inventor: Hsin-Liang Kuo, Taoyuan (TW)

(73) Assignee: MiTAC Digital Technology Corporation, Taoyuan (TW)

( * ) Notice: Subject to any disclaimer, the term of this patent is extended or adjusted under 35 U.S.C. 154(b) by 232 days.

(21) Appl. No.: 17/962,655

(22) Filed: Oct. 10, 2022

(65) Prior Publication Data

US 2023/0117426 A1 Apr. 20, 2023

(30) Foreign Application Priority Data

Oct. 14, 2021 (TW) .................................. 110138206

(51) Int. Cl.
*G06V 20/58* (2022.01)
*G08G 1/01* (2006.01)
*G08G 1/04* (2006.01)
*G08G 1/054* (2006.01)
*G08G 1/0962* (2006.01)

(52) U.S. Cl.
CPC ......... *G08G 1/0129* (2013.01); *G06V 20/582* (2022.01); *G08G 1/0112* (2013.01); *G08G 1/04* (2013.01); *G08G 1/054* (2013.01); *G08G 1/09623* (2013.01)

(58) Field of Classification Search
CPC . G06V 20/582; G08G 1/09623; G08G 1/0967
See application file for complete search history.

(56) References Cited

U.S. PATENT DOCUMENTS 8,085,166 B2 * 12/2011 Tamir ................. G06Q 30/0283
340/901
10,300,853 B2 * 5/2019 Yokochi .................. B60R 11/04
(Continued)

FOREIGN PATENT DOCUMENTS

EP          3499480 A1 *  6/2019  ............. B60K 31/00
JP     2009110394 A  *  5/2009
(Continued)

OTHER PUBLICATIONS

JP 2009110394 A—Machine Translation (Year: 2009).*
JP 2012068962 A—machine translation (Year: 2012).*
JP 7081316 B2—Machine Translation (Year: 2022).*

*Primary Examiner* — Dino Kujundzic
(74) *Attorney, Agent, or Firm* — Blank Rome LLP

(57) ABSTRACT

In a system for adaptively providing auxiliary driving information, a processing unit, which is installed in a vehicle, acquires traffic sign(s) from vehicle driving images, and determines whether a driver of the vehicle is familiar with a current road section, and whether the driver has good driving habits. Based on the determinations and reference information that is related to a traffic violation history and/or a dangerous situation of the current road section, the processing unit selects prompt object(s) from the traffic sign(s), and determines a prompt order of the prompt object(s). Then, the processing unit causes an output module to perceivably output the prompt objects in the prompt order.

16 Claims, 2 Drawing Sheets

(56) References Cited

U.S. PATENT DOCUMENTS

| | | | | |
|---|---|---|---|---|
| 10,510,248 B2* | 12/2019 | Hou | ................ | G06V 10/764 |
| 2012/0158283 A1* | 6/2012 | Arastafar | ........... | G01C 21/3641 |
| | | | | 701/410 |
| 2016/0351051 A1* | 12/2016 | Murthy | ................ | G06V 20/588 |
| 2017/0106864 A1* | 4/2017 | Masuda | ................ | G06V 20/582 |
| 2017/0154523 A1* | 6/2017 | Moritani | ................ | G08B 25/08 |
| 2017/0219375 A1* | 8/2017 | Murayama | ......... | G01C 21/3697 |
| 2017/0336627 A1* | 11/2017 | Ieda | ................ | G01C 21/36 |
| 2020/0034635 A1* | 1/2020 | Sato | ................ | G08G 1/09626 |
| 2022/0317443 A1* | 10/2022 | Matsui | ................ | G06V 20/588 |
| 2023/0102205 A1* | 3/2023 | Delaney | ................ | B60K 35/00 |
| | | | | 707/740 |

FOREIGN PATENT DOCUMENTS

| | | | | |
|---|---|---|---|---|
| JP | 2012068962 A | * | 4/2012 | |
| JP | 7081316 B2 | * | 6/2022 | ............ B60W 50/14 |

* cited by examiner

METHOD AND SYSTEM FOR ADAPTIVELY PROVIDING AUXILIARY DRIVING INFORMATION

CROSS-REFERENCE TO RELATED APPLICATION

This application claims priority of Taiwanese Invention Patent Application No. 110138206, filed on Oct. 14, 2021.

FIELD

The disclosure relates to detecting auxiliary driving information, and more particularly to a method and a system for adaptively providing auxiliary driving information.

BACKGROUND

Taiwanese Patent No. 1657950B discloses a conventional auxiliary identification device for indicator objects (e.g., road signs). The conventional auxiliary identification device performs image recognition on images of a view in a travelling direction of a vehicle so as to identify indicator objects, and displays the indicator objects thus identified in an order that is determined based on priority settings preset in an in-vehicle system with respect to these indication objects, so a driver of the vehicle can easily take notice of road conditions ahead and operate the vehicle responsively (e.g., changing a lane in advance). In some cases, the abovementioned auxiliary identification device may determine the display order of displaying the identified indicator objects mainly based on default system settings.

The display order may be adjusted slightly with manual settings or based on the current driving conditions (e.g., when a distance between the vehicle and a road exit is shorter than a predetermined distance, when a vehicle speed exceeds a speed limit, etc.).

SUMMARY

However, in the conventional auxiliary identification device, adaptive conditions such as the driver's driving habits, familiarity of the driver with respect to the route, and environmental conditions or information with respect to the road are not taken into consideration when determining the display order of the indicator objects.

Therefore, an object of the disclosure is to provide a method and a system for adaptively providing auxiliary driving information, which can alleviate at least one of the drawbacks of the prior art, so as to enhance driving safety.

According to the disclosure, the method is implemented by a processor located in a vehicle that is currently running on a current road section, and includes steps of: A) acquiring vehicle driving images, vehicle control information and vehicle positioning data from an in-vehicle system of the vehicle, wherein the vehicle driving images, the vehicle control information and the vehicle positioning data correspond to a current driving condition of the vehicle, and wherein the vehicle driving images include images of a view in front of the vehicle, and the vehicle control information is related to a current vehicle speed and a current vehicle direction control; B) using image recognition to acquire one or more traffic signs that correspond to the current road section from the vehicle driving images; C) determining whether a driver of the vehicle is familiar with the current road section based on the vehicle positioning data and a vehicle travel route history of the vehicle, so as to obtain a first determination result; D) determining whether the driver has good driving habits in terms of vehicle speed control and lane-changing based on the current vehicle speed, a vehicle control history of the vehicle, and speed limit information that includes a speed limit of the current road section, so as to obtain a second determination result; E) selecting one or more prompt objects from said one or more traffic signs, and determining a prompt order of said one or more prompt objects based on reference information, the first determination result and the second determination result, wherein the reference information is related to one of a traffic violation history that corresponds to the current road section and a dangerous situation that corresponds to the current road section; and F) causing an output module that is located in the vehicle to provide the auxiliary driving information by perceivably outputting said one or more prompt objects in the prompt order.

According to the disclosure, the system is provided for adaptively providing auxiliary driving information to a driver of a vehicle that is equipped with an in-vehicle system and that is currently running on a current road section. The in-vehicle system is configured to provide vehicle driving images, vehicle control information and vehicle positioning data that correspond to a current driving condition of the vehicle. The vehicle driving images includes images of a view in front of the vehicle. The vehicle control information is related to a current vehicle speed and a current vehicle direction control. The system includes a data server and an electronic device. The data server is to be connected to a network, and is configured to provide reference information. The reference information is related to one of a traffic violation history that corresponds to the current road section and a dangerous situation that corresponds to the current road section. The electronic device includes a communication module, a storage module and a processing unit. The communication module to be connected to the network. The storage module stores a vehicle travel route history and a vehicle control history of the vehicle, and speed limit information that includes a speed limit of the current road section. The processing unit is to be connected to the in-vehicle system for receiving the vehicle driving images, the vehicle control information and the vehicle positioning data, is connected to the storage module for receiving the vehicle travel route history, the vehicle control history and the speed limit information therefrom, and is connected to the communication module for receiving the reference information from the data server therethrough. The processing unit is configured to use image recognition to acquire one or more traffic signs that correspond to the current road section from the vehicle driving images. The processing unit is configured to determine whether the driver is familiar with the current road section based on the vehicle positioning data and the vehicle travel route history, so as to obtain a first determination result. The processing unit is configured to determine whether the driver has good driving habits in terms of vehicle speed control and lane-changing based on the current vehicle speed, the vehicle control history and the speed limit information, so as to obtain a second determination result. The processing unit is configured to select one or more prompt objects from the one or more traffic signs, and to determine a prompt order of the one or more prompt objects based on the reference information, the first determination result and the second determination result. The processing unit is configured to cause an output module that is located in the vehicle to provide the auxiliary driving information by perceivably outputting the one or more prompt objects in the prompt order.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
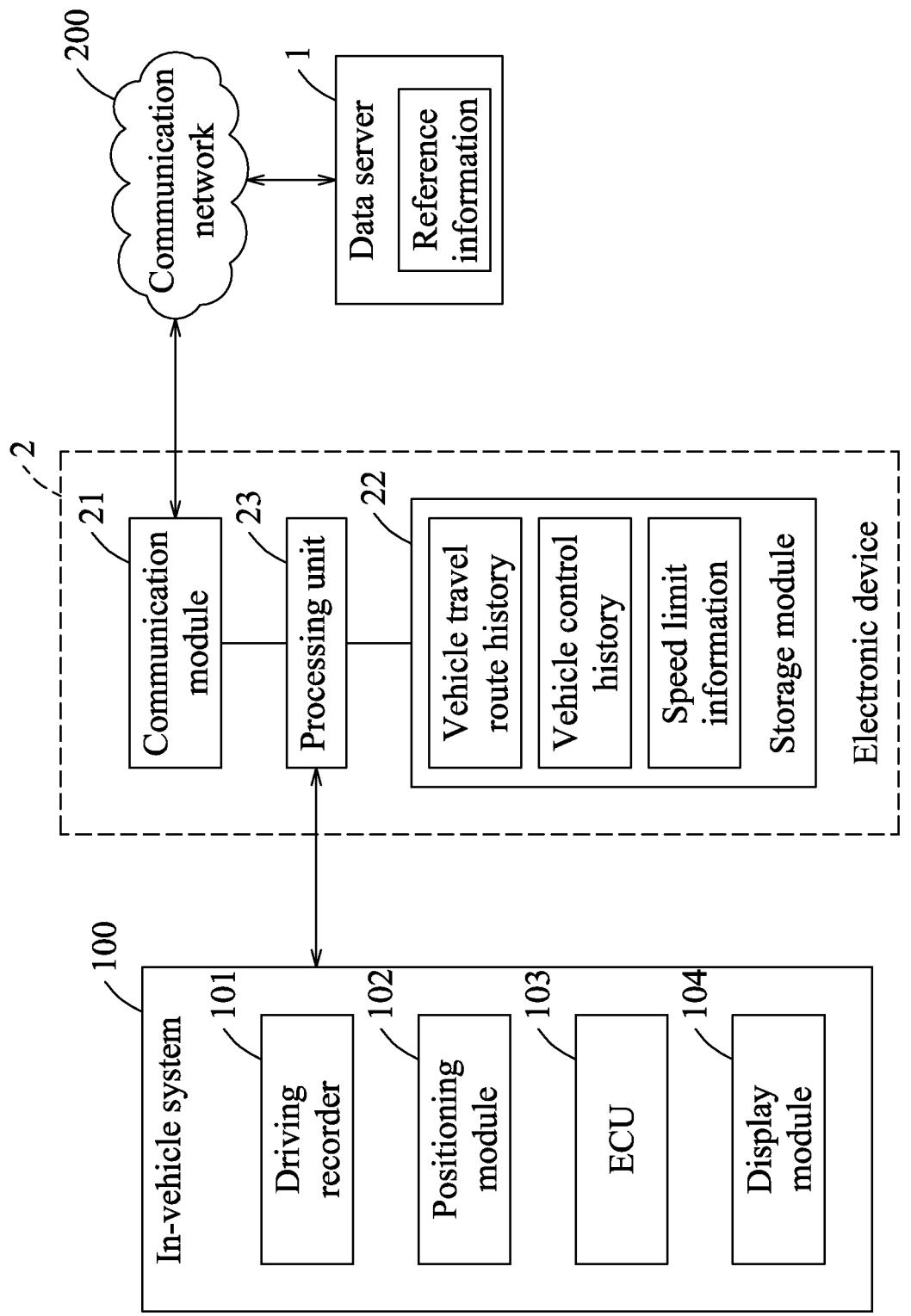
FIG. 1 is a block diagram illustrating an embodiment of a system for adaptively providing auxiliary driving information according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system according to this disclosure is provided for adaptively providing auxiliary driving information to a driver of a vehicle (not shown) when the vehicle is running on a current road section, wherein the vehicle has an in-vehicle system 100.

In this embodiment, the in-vehicle system 100 may include, for example, a driving recorder 101, a positioning module 102 (e.g., a global positioning system (GPS) module), an electronic control unit (ECU) 103 and an output module, which is realized as a display module 104 herein. The driving recorder 101 is operable to capture images of a view outside of the vehicle (referred to as vehicle driving images hereinafter) that correspond to a current driving condition after the vehicle is started, so as to obtain driving recorder data. In practice, the vehicle driving images include at least images of a view in front of the vehicle. The positioning module 102 is operable to position the vehicle after the vehicle is started, so as to obtain vehicle positioning data that corresponds to the current driving condition and that may include, for example, a vehicle location and a vehicle speed. In some embodiments, the positioning module 102 may further acquire time information that corresponds to the vehicle location (e.g., the time the vehicle is at the vehicle location thus determined using positioning technique), and the vehicle positioning data may further include the time information (referred to as positioning time hereinafter). In some embodiments, the positioning module 102 may be capable of navigation, and thus can provide a navigation history of the vehicle that is related to all previous navigation routes and that may serve as a travel route history of the vehicle (referred to as "vehicle travel route history" hereinafter). The ECU 103 is operable to monitor driver's operations that are performed on the vehicle after the vehicle is started, especially with respect to operations that are related to control of the vehicle speed and a travelling direction of the vehicle, so as to obtain vehicle control information that corresponds to the current driving condition. As a result, the in-vehicle system 100 is capable of providing the driving recorder data, which includes the vehicle driving images, the vehicle control information, the vehicle positioning data and/or navigation history.

In this embodiment, the system for adaptively providing the auxiliary driving information includes a data server 1, and an electronic device 2 that is located or installed in the vehicle. The electronic device 2 communicates with the data server 1 through a communication network 200 (e.g., a wireless communication network).

The data server 1 may be, for example, a backend server or a cloud server that is operable to collect and continuously update a traffic violation history and dangerous situations (e.g., related to natural disaster, such as heavy rain, earthquake, etc., related to accidents, related to road adjustment rules, such as lane reversal, and/or related to heavy traffic conditions, such as a time for going to school or time for leaving school for the day) of every road section within a geographical region. In practice, the data server 1 may receive, from the electronic device 2, a request for acquiring the traffic violation history and the dangerous situations that correspond to the current road section (collectively referred to as reference information hereinafter), and then transmit the reference information to the electronic device 2 in response to the request.

In this embodiment, the electronic device 2 is independent of the in-vehicle system 100, and may be realized as, for example but not limited to, a portable device, such as a smartphone held by the driver. The electronic device 2 may include a communication module 21 (e.g., including a communication integrated circuit (IC) and an antenna module) for connection to the communication network 200, a storage module 22 (e.g., flash memory), and a processing unit 23 (e.g., a processor) that is connected to the communication module 21 and the storage module 22. In a case that the electronic device 2 is a smartphone of the driver, a GPS module (not shown) of the smartphone may be used as the positioning module 102. In some embodiments, the functions of the electronic device 2, which will be introduced hereinafter, may be integrated into the in-vehicle system 100. That is, the in-vehicle system 100 may include a communication module, a storage module, and a processing unit, where the processing unit can be integrated into the ECU 103. In such a scenario, the in-vehicle system 100 is capable of connecting the data server 1 for data transmission therewith through the communication network 200.

In this embodiment, the storage module 22 stores the vehicle travel route history, a vehicle control history (e.g., related to vehicle speed control and vehicle direction control), and speed limit information that includes a speed limit of the current road section. In detail, the vehicle travel route history may include road sections or routes that the vehicle has travelled in a period of the past, and the vehicle control history may include, with respect to every road section (e.g., every road section is 1 km long) and corresponding to a predetermined recent period (e.g., the most recent week or the most recent month), an average number of lane changes (referred to as "lane change average" hereinafter) made while running on the current road section within the predetermined recent period, and an average of vehicle speeds the vehicle travelled in while running on the current road section in the predetermined recent period (referred to as "vehicle speed average" hereinafter). In some embodiments, the lane change average may refer to the number of lane changes that were made on average every time the vehicle ran on the current road section. In some embodiments, the lane change average may refer to the number of lane changes that were made on average per unit length of time (e.g., three minutes) when the vehicle ran on the current road section. In some embodiments, the lane change average may refer to the number of lane changes that were made on average per unit distance (e.g., one kilometer) when the vehicle ran on the current road section. It is noted that the average computation is made based on data that is related to lane changes made while running on the current road section during the predetermined recent period.

The processing unit 23 may be connected to the in-vehicle system 100 through a connection interface (e.g., a universal serial bus (USB) interface) or a short-range wireless communication module (e.g., a Bluetooth module), so as to receive the driving recorder data, the vehicle control information, the vehicle positioning data and the navigation data from the in-vehicle system 100. The processing unit 23 further transmits, through the communication module 21, the request for acquiring the reference information that corresponds to the current road section, and receives the reference information from the data server 1 through the communication module 21.

Figure 2:
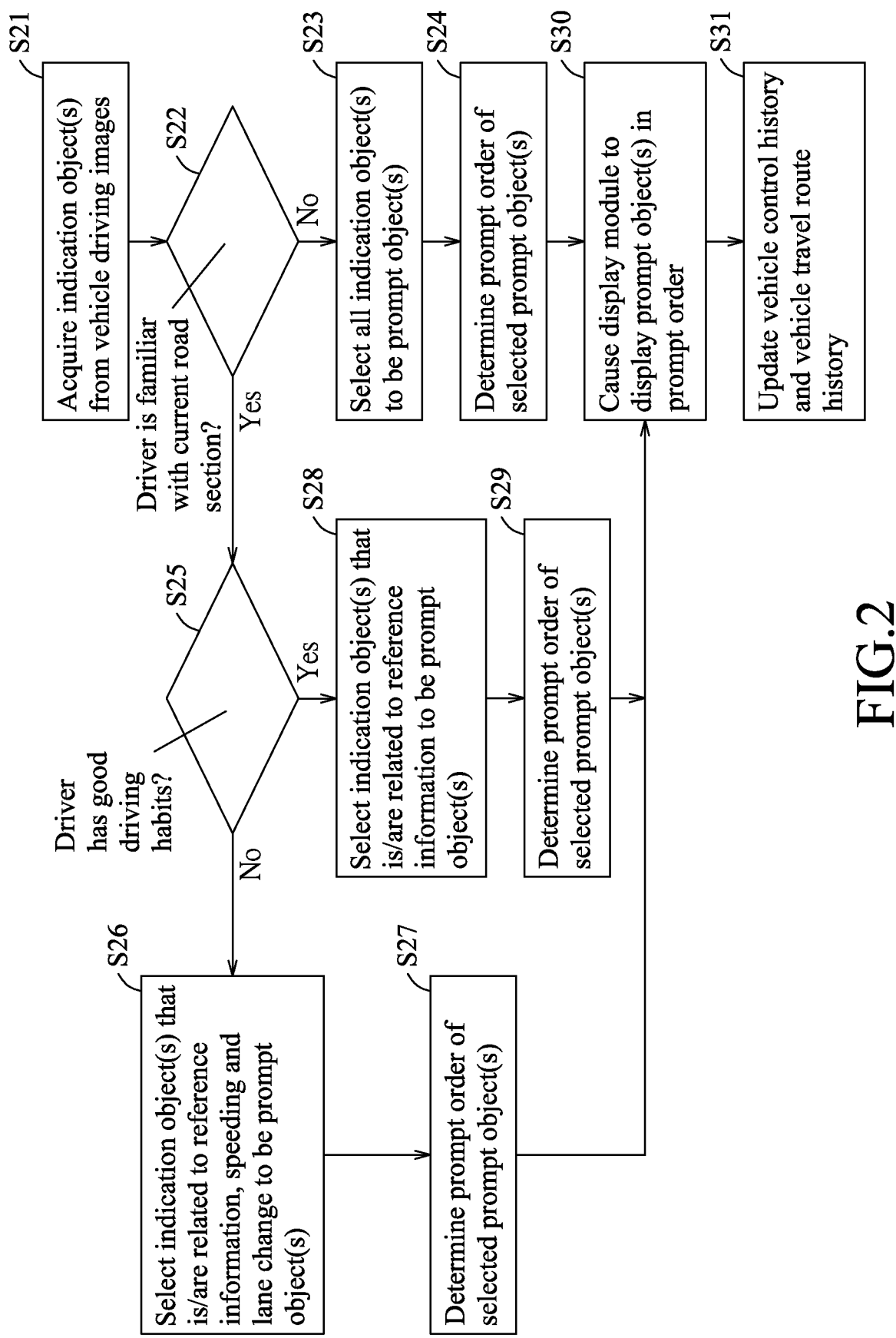
FIG. 2 is a flow chart illustrating steps of an embodiment of a method for adaptively providing auxiliary driving information according to the disclosure.

Referring to FIGS. 1 and 2, an embodiment of a procedure is provided for the processing unit 23 to implement a method for adaptively providing auxiliary driving information when the vehicle is running on a current road section.

In step S21, the processing unit 23 uses image recognition to acquire one or more indication objects that correspond to the current road section from the vehicle driving images of the driving recorder data. In this embodiment, the indication objects are traffic signs, which may be classified into the following categories: warning signs (school zone warning sign, falling rocks warning sign, etc.), mandatory signs (buses only sign, stop sign, etc.), prohibitory signs (no entry sign, parking prohibited sign, etc.), limit signs (speed limit signs, weight limit signs, etc.), informational signs (highway directional signs, highway location markers (e.g., mile markers), etc.), supplementary signs (signs or panels used to clarify the meaning of other signs, or signs that do not belong to any of the abovementioned categories), etc. It should be noted that different regions or countries may classify traffic signs differently, and this disclosure is not limited to the examples given herein. Moreover, image recognition techniques should be familiar to those skilled in the relevant art, so details thereof are omitted herein for the sake of brevity.

In step S22, the processing unit 23 determines whether the driver of the vehicle is familiar with the current road section based on the vehicle positioning data and the vehicle travel route history of the vehicle, so as to obtain a first determination result. In detail, the processing unit 23 determines, based on the vehicle travel route history, whether a passing-through number has reached a predetermined passing-through threshold, where the passing-through number is a number of times the vehicle has passed through the current road section within the predetermined recent period. For example, the processing unit 23 may determine whether the vehicle has passed through the current road section three times or more within the most recent week (i.e., the predetermined passing-through threshold is three, and the predetermined recent period is the most recent week), or whether the vehicle has passed through the current road section ten times or more within the most recent month (i.e., the predetermined passing-through threshold is ten, and the predetermined recent period is the most recent month). Upon determining that the passing-through number has reached the predetermined passing-through threshold, it means that the processing unit 23 determines that the driver is familiar with the current road section, and the processing unit 23 generates the first determination result to indicate that the driver is familiar with the current road section, and the flow goes to step S25. Upon determining that the passing-through number has not reached the predetermined passing-through threshold, it means that the processing unit 23 determines that the driver is not familiar with the current road section, and the processing unit 23 generates the first determination result to indicate that the driver is not familiar with the current road section, and the flow goes to step S23.

However, for the same road section, different time sections may lead to different road or traffic conditions. For example, a driver may drive the vehicle on a road section frequently in the nighttime but rarely in the evening, in which many students may walk through the road section after school, so the driver may be familiar with a nighttime condition of the road section but unfamiliar with an evening condition of the road section. Therefore, in some embodiments, the processing unit 23 may determine whether the driver of the vehicle is familiar with the current road section further based on a current time (e.g., the latest positioning time). In one example, a day can be divided into multiple predetermined time sections, such as a first predetermined time section from 6 AM to 1 PM, a second predetermined time section from 1 PM to 6 PM, and a third predetermined time section from 6 PM to 6 AM. The processing unit 23 may determine which one of the predetermined time sections the current time corresponds to, and then determine, based on the vehicle travel route history, whether a passing-through number in the corresponding predetermined time section of the predetermined recent period has reached the predetermined passing-through threshold.

In step S23, the processing unit 23 selects all of the indication object(s) to be prompt object(s). In step S24 that follows step S23, the processing unit 23 determines a prompt order of the prompt object(s) based on the reference information, such that one(s) of the prompt object(s) that is/are related to the reference information has/have a higher order than one(s) of the prompt object(s) that is/are not related to the reference information. In detail, the processing unit 23 may first sort the prompt object(s) to obtain a preliminary order based on a predetermined rule (e.g., priorities from high to low: warning signs, prohibitory signs, limit signs, mandatory signs, informational signs, supplementary signs), and then adjust the preliminary order by making the one(s) of the prompt object(s) related to the reference information have a higher priority, so as to obtain the prompt order. In one example, when the vehicle is running on a road section at a time that falls in a time section, and the reference information indicates that the road section is busy in this time section because the time for leaving school falls in this time section, the processing unit 23 may determine a prompt order where one(s) of the prompt object(s) related to the busy condition (e.g., a pedestrian crossing sign, a children crossing sign, a school safety sign, etc.) has a higher priority. In one example, when the vehicle is running on a road section at a time that falls in a time section, and the reference information indicates that the road section has a reversible lane in the time section, the processing unit 23 may determine a prompt order where one(s) of the prompt object(s) related to the lane reversal has a higher priority.

In step S25, the processing unit 23 determines whether the driver has good driving habits in terms of vehicle speed control and lane-changing based on a current vehicle speed, the vehicle control history of the vehicle, and the speed limit information that includes the speed limit of the current road section, so as to obtain a second determination result. In this embodiment, the processing unit 23 performs the following operations to generate the second determination result: (i) acquiring the current vehicle speed of the vehicle that is running on the current road section based on the vehicle driving images or the vehicle control information; (ii) determining whether the current vehicle speed is greater than the speed limit of the current road section as indicated in the speed limit information, so as to generate a vehicle speed determination result; (iii) based on the vehicle control history, determining whether the lane change average that corresponds to the current road section is greater than a predetermined lane change threshold, and whether the vehicle speed average that corresponds to the current road section is greater than the speed limit of the current road section, so as to generate a driving habit determination result; and (iv) generating the second determination result based on the vehicle speed determination result and the driving habit determination result. The second determination result generated by the processing unit 23 indicates that the driver does not have good driving habits when any one of a first determination condition, a second determination condition and a third determination condition is true. The first determination condition is that the vehicle speed determination result indicates that the current vehicle speed is greater than the speed limit of the current road section. The second determination condition is that the driving habit determination result indicates that the vehicle speed average is greater than the speed limit of the current road section. The third determination condition is that the driving habit determination result indicates that the lane change average is greater than the predetermined lane change threshold. In other words, when the driver is used to speeding or frequent lane-changing, the processing unit 23 will determine that the driver does not have good driving habits, and the flow goes to step S26. The second determination result generated by the processing unit 23 indicates that the driver has good driving habits when the vehicle speed determination result indicates that the current vehicle speed is not greater than the speed limit of the current road section (i.e., the vehicle is not speeding), and the driving habit determination result indicates that the vehicle speed average is not greater than the speed limit of the current road section (the driver is not used to speeding) and that the lane change average is not greater than the predetermined lane change threshold (the driver is not used to changing lanes frequently), which means that the driver has good driving habits, and the flow goes to step S28. One would appreciate that tolerances may be applicable to the determination of whether or not the vehicle is speeding.

In some embodiments, the vehicle control history of the vehicle may include, with respect to all road sections, a total number of speeding violations within the predetermined recent period and a total number of zigzag driving within the predetermined recent period, each of which may be obtained from a number of times an advanced driver-assistance system of the vehicle was triggered for the corresponding situation, and the driving habit determination result may be generated based on or further based on (i.e., in addition to the aforesaid operation (iii)) a determination regarding whether the total number of speeding violations exceeds a predetermined speeding violation threshold and/or a determination regarding whether the total number of zigzag driving exceeds a predetermined zigzag driving threshold. The second determination result generated by the processing unit 23 may also indicate that the driver does not have good driving habits when the total number of speeding violations exceeds the predetermined speeding violation threshold or when the total number of zigzag driving exceeds the predetermined zigzag driving threshold.

In step S26, the processing unit 23 selects any of the indication object(s) that is related to one of the reference information, a speeding behavior (or the speed limit of the current road section) and the lane change to be the prompt object(s). In step S27 that follows step S26, the processing unit 23 determines the prompt order such that any prompt object that is related to the reference information has a higher order than any prompt object that is related to one of the speeding behavior and the lane change.

In one example where the following conditions are met: (a1) the processing unit 23 determines in step S25 that the driver does not have good driving habits; (a2) the current road section is in a mountainous area; (a3) the reference information indicates a dangerous situation where the current road section is encountering continuous heavy rain; and (a4) the prompt objects selected by the processing unit 23 in step S26 from the indication objects include a warning sign that warns against falling rocks (hereinafter referred to as the "falling rocks warning sign"), a limit sign that indicates a speed limit of 50 km/hr (hereinafter referred to as the "speed limit sign"), and a prohibitory sign that indicates prohibition against overtaking (hereinafter referred to as the "no overtaking sign"), the processing unit 23 may determine, in step S27, the prompt order of the three prompt objects to be such that the falling rocks warning sign has a priority higher than priorities of the speed limit sign and the no overtaking sign, and the latter two have the same priority. In another example where the abovementioned conditions (a1), (a2), (a4) are met but the reference information does not indicate any dangerous situations, the processing unit 23 may determine, in step S27, the prompt order to be such that the priorities of the speed limit sign and the no overtaking sign is higher than the priority of the falling rocks warning sign.

In one example where the following conditions are met: (b1) the processing unit 23 determines in step S22 that the driver is not familiar with the current road section; (b2) the current road section is in a mountainous area; (b3) the reference information indicates a dangerous situation where the current road section is encountering continuous heavy rain; and (b4) the prompt objects selected by the processing unit 23 in step S23 from the indication objects include a falling rocks warning sign, a speed limit sign that indicates a speed limit of 50 km/hr, and a no overtaking sign, the prompt order determined by the processing unit 23 in step S24 may be that the falling rocks warning sign has a priority higher than priorities of the speed limit sign and the no overtaking sign.

In step S28, the processing unit 23 selects one(s) of the indication object(s) that is/are related to the reference information to be the prompt object(s). In step S29 that follows step S28, the processing unit 23 determines the prompt order based on the reference information. For example, when the following conditions are met: (c1) the current road section has heavy traffic; (c2) the reference information indicates that violations against "no left turn" and "no parking" frequently happened in the current road section (traffic violation history); and (c3) the prompt objects selected by the processing unit 23 in step S28 from the indication objects include prohibitory signs of "no left turn" and "no parking", the processing unit 23 may determine the prompt order such that one of "no left turn" and "no parking" that has more accumulated violations has a higher priority than the other.

In step S30 that follows steps S24, S27 and S29, the processing unit 23 transmits all of the prompt object(s) and the prompt order to the in-vehicle system 100, and causes the output module that is located inside the vehicle to provide the auxiliary driving information by perceivably outputting the prompt object(s) in the prompt order. In this embodiment, the display module 104 (e.g., a liquid crystal display or the like) is used to provide the auxiliary driving information by displaying the prompt object(s) in the prompt order. In some embodiments, the output module of the in-vehicle system 100 may further include an audio module (e.g., a speaker system, not shown), and the processing unit 23 may transmit the prompt order and audio data that corresponds to all of the prompt object(s) to the in-vehicle system 100, and cause the audio module to provide the auxiliary driving information by audibly outputting the prompt object(s) in the prompt order.

In step S31, the processing unit 23 updates the vehicle control history and the vehicle travel route history based on the vehicle control information and the vehicle positioning information, respectively.

Furthermore, the processing unit 23 may store the vehicle control history and the auxiliary driving information in a database (not shown). Then, the driver's operation with respect to vehicle control in response to the auxiliary driving information can be analyzed based on these data, and can be fed back to the system for adjusting a timing and/or a prompt intensity for providing the auxiliary driving information in the future, thereby enhancing driving safety.

In summary, the processing unit 23 selects the prompt object(s) from the indication object(s) and determines the prompt order based on the driving habits of the driver, the familiarity of the driver with the current road section, and the reference information in terms of traffic violation history and/or dangerous situation(s) that correspond to the current road section. Then, the prompt object(s) is/are presented to the driver in the prompt order through the display module 104 and/or the audio module, so as to provide the auxiliary driving information that is adaptive to the driver, thereby enhancing driving safety.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for adaptively providing auxiliary driving information, said method being implemented by a processor located in a vehicle that is currently running on a current road section, said method comprising steps of:
   A) acquiring vehicle driving images, vehicle control information and vehicle positioning data from an in-vehicle system of the vehicle, wherein the vehicle driving images, the vehicle control information and the vehicle positioning data correspond to a current driving condition of the vehicle, and wherein the vehicle driving images include images of a view in front of the vehicle, and the vehicle control information is related to a current vehicle speed and a current vehicle direction control;
   B) using image recognition to acquire one or more traffic signs that correspond to the current road section from the vehicle driving images;
   C) determining whether a driver of the vehicle is familiar with the current road section based on the vehicle positioning data and a vehicle travel route history of the vehicle, so as to obtain a first determination result;
   D) determining whether the driver has good driving habits in terms of vehicle speed control and lane-changing based on the current vehicle speed, a vehicle control history of the vehicle, and speed limit information that includes a speed limit of the current road section, so as to obtain a second determination result;
   E) selecting one or more prompt objects from said one or more traffic signs, and determining a prompt order of said one or more prompt objects based on reference information, the first determination result and the second determination result, wherein the reference information is related to one of a traffic violation history that corresponds to the current road section and a dangerous situation that corresponds to the current road section; and
   F) causing an output module that is located in the vehicle to provide the auxiliary driving information by perceivably outputting said one or more prompt objects in the prompt order.

2. The method of claim 1, wherein step C) includes:
   determining, based on the vehicle travel route history, whether a passing-through number has reached a predetermined passing-through threshold, wherein the passing-through number is a number of times the vehicle has passed through the current road section within a predetermined recent period;
   generating the first determination result to indicate that the driver is familiar with the current road section upon determining that the passing-through number has reached the predetermined passing-through threshold; and
   generating the first determination result to indicate that the driver is not familiar with the current road section upon determining that the passing-through number has not reached the predetermined passing-through threshold.

3. The method of claim 2, wherein the vehicle control history includes, corresponding to the predetermined recent period and the current road section, a lane change average that is an average of numbers of lane changes made while running on the current road section within the predetermined recent period, and a vehicle speed average of the vehicle that is an average of vehicle speeds the vehicle travelled in while running on the current road section in the predetermined recent period;
   wherein step D) includes:
      acquiring the current vehicle speed based on the vehicle driving images or the vehicle control information;
      determining whether the current vehicle speed is greater than the speed limit of the current road section as indicated in the speed limit information, so as to generate a vehicle speed determination result;
      determining whether the lane change average is greater than a predetermined lane change threshold, and whether the vehicle speed average is greater than the speed limit of the current road section, so as to generate a driving habit determination result; and generating the second determination result based on the vehicle speed determination result and the driving habit determination result;

wherein the second determination result indicates that the driver does not have good driving habits when any one of a first determination condition, a second determination condition and a third determination condition is true;

wherein the first determination condition is that the vehicle speed determination result indicates that the current vehicle speed is greater than the speed limit of the current road section;

wherein the second determination condition is that the driving habit determination result indicates that the vehicle speed average is greater than the speed limit of the current road section;

wherein the third determination condition is that the driving habit determination result indicates that the lane change average is greater than the predetermined lane change threshold; and wherein the second determination result indicates that the driver has good driving habits when the vehicle speed determination result indicates that the current vehicle speed is not greater than the speed limit of the current road section, and the driving habit determination result indicates that the vehicle speed average is not greater than the speed limit of the current road section and that the lane change average is not greater than the predetermined lane change threshold.

4. The method of claim 3, further comprising, after step D), a step of: G) updating the vehicle control history and the vehicle travel route history based on the vehicle control information and the vehicle positioning information.

5. The method of claim 3, wherein step E) includes:

when the first determination result indicates that the driver is not familiar with the current road section, selecting all of said one or more traffic signs to be said one or more prompt objects, and determining the prompt order such that a portion of said one or more prompt objects that is related to the reference information has a higher order than a portion of said one or more prompt objects that is not related to the reference information;

when the first determination result indicates that the driver is familiar with the current road section, and the second determination result indicates that the driver does not have good driving habits, selecting a portion of said one or more traffic signs that is related to one of the reference information, a speeding behavior and the lane change to be said one or more prompt objects, and determining the prompt order such that the portion of said one or more prompt objects that is related to the reference information has a higher order than a portion of said one or more prompt objects that is related to one of the speeding behavior and the lane change; and when the first determination result indicates that the driver is familiar with the current road section, and the second determination result indicates that the driver has good driving habits, selecting a portion of the said one or more traffic signs that is related to the reference information to be said one or more prompt objects, and determining the prompt order based on the reference information.

6. The method of claim 2, wherein the vehicle control history includes a total number of speeding violations within the predetermined recent period, and a total number of zigzag driving within the predetermined recent period;

wherein step D) includes:

determining whether the total number of speeding violations exceeds a predetermined speeding violation threshold; and determining whether the total number of zigzag driving exceeds a predetermined zigzag driving threshold;

wherein the second determination result indicates that the driver does not have good driving habits when any one of a first determination condition and a second determination condition is true;

wherein the first determination condition is that the total number of speeding violations exceeds the predetermined speeding violation threshold; and wherein the second determination condition is that the total number of zigzag driving exceeds the predetermined zigzag driving threshold.

7. The method of claim 1, wherein, in step C), whether a driver of the vehicle is familiar with the current road section is determined further based on a current time.

8. The method of claim 7, wherein a day is divided into multiple predetermined time sections, and step C) includes:

determining which one of the predetermined time sections the current time corresponds to;

determining, based on the vehicle travel route history, whether a passing-through number in said one of the predetermined time sections of a predetermined recent period has reached a predetermined passing-through threshold, wherein the passing-through number is a number of times the vehicle has passed through the current road section;

generating the first determination result to indicate that the driver is familiar with the current road section upon determining that the passing-through number has reached the predetermined passing-through threshold; and generating the first determination result to indicate that the driver is not familiar with the current road section upon determining that the passing-through number has not reached the predetermined passing-through threshold.

9. A system for adaptively providing auxiliary driving information to a driver of a vehicle that is equipped with an in-vehicle system and that is currently running on a current road section, the in-vehicle system being configured to provide vehicle driving images, vehicle control information and vehicle positioning data that correspond to a current driving condition of the vehicle, the vehicle driving images including images of a view in front of the vehicle, the vehicle control information being related to a current vehicle speed and a current vehicle direction control, said system comprising:

a data server that is to be connected to a network, and that is configured to provide reference information, wherein the reference information is related to one of a traffic violation history that corresponds to the current road section and a dangerous situation that corresponds to the current road section; and an electronic device that includes a communication module to be connected to the network, a storage module storing a vehicle travel route history and a vehicle control history of the vehicle, and speed limit information that includes a speed limit of the current road section, and a processing unit to be connected to the in-vehicle system for receiving the vehicle driving images, the vehicle control information and the vehicle positioning data, connected to said storage module for receiving the vehicle travel route history, the vehicle control history and the speed limit information therefrom, and connected to said communication module for receiving the reference information from said data server therethrough;

wherein said processing unit is configured to use image recognition to acquire one or more traffic signs that correspond to the current road section from the vehicle driving images;

wherein said processing unit is configured to determine whether the driver is familiar with the current road section based on the vehicle positioning data and the vehicle travel route history, so as to obtain a first determination result;

wherein said processing unit is configured to determine whether the driver has good driving habits in terms of vehicle speed control and lane-changing based on the current vehicle speed, the vehicle control history and the speed limit information, so as to obtain a second determination result;

wherein said processing unit is configured to select one or more prompt objects from said one or more traffic signs, and to determine a prompt order of said one or more prompt objects based on the reference information, the first determination result and the second determination result; and wherein said processing unit is configured to cause an output module that is located in the vehicle to provide the auxiliary driving information by perceivably outputting said one or more prompt objects in the prompt order.

10. The system of claim 9, wherein said processing unit is configured to determine, based on the vehicle travel route history, whether a passing-through number has reached a predetermined passing-through threshold, wherein the passing-through number is a number of times the vehicle has passed through the current road section within a predetermined recent period;

wherein said processing unit is configured to generate the first determination result to indicate that the driver is familiar with the current road section upon determining that the passing-through number has reached the predetermined passing-through threshold; and wherein said processing unit is configured to generate the first determination result to indicate that the driver is not familiar with the current road section upon determining that the passing-through number has not reached the predetermined passing-through threshold.

11. The system of claim 10, wherein the vehicle control history includes, corresponding to the predetermined recent period and the current road section, a lane change average that is an average of numbers of lane changes made while running on the current road section within the predetermined recent period and a vehicle speed average of the vehicle that is an average of vehicle speeds the vehicle travelled in while running on the current road section in the predetermined recent period;

wherein said processing unit is configured to acquire the current vehicle speed based on the vehicle driving images or the vehicle control information;

wherein said processing unit is configured to determine whether the current vehicle speed is greater than the speed limit of the current road section as indicated in the speed limit information, so as to generate a vehicle speed determination result;

wherein said processing unit is configured to determine whether the lane change average is greater than a predetermined lane change threshold, and whether the vehicle speed average is greater than the speed limit of the current road section, so as to generate a driving habit determination result;

wherein said processing unit is configured to generate the second determination result based on the vehicle speed determination result and the driving habit determination result;

wherein the second determination result indicates that the driver does not have good driving habits when any one of a first determination condition, a second determination condition and a third determination condition is true;

wherein the first determination condition is that the vehicle speed determination result indicates that the current vehicle speed is greater than the speed limit of the current road section;

wherein the second determination condition is that the driving habit determination result indicates that the vehicle speed average is greater than the speed limit of the current road section;

wherein the third determination condition is that the driving habit determination result indicates that the lane change average is greater than the predetermined lane change threshold; and wherein the second determination result indicates that the driver has good driving habits when the vehicle speed determination result indicates that the current vehicle speed is not greater than the speed limit of the current road section, and the driving habit determination result indicates that the vehicle speed average is not greater than the speed limit of the current road section and that the lane change average is not greater than the predetermined lane change threshold.

12. The system of claim 11, wherein said processing unit is configured to update the vehicle control history and the vehicle travel route history based on the vehicle control information and the vehicle positioning information.

13. The system of claim 11, wherein said processing unit is configured to, when the first determination result indicates that the driver is not familiar with the current road section, select all of said one or more traffic signs to be said one or more prompt objects, and determine the prompt order such that a portion of said one or more prompt objects that is related to the reference information has a higher order than a portion of said one or more prompt objects that is not related to the reference information;

wherein said processing unit is configured to, when the first determination result indicates that the driver is familiar with the current road section, and the second determination result indicates that the driver does not have good driving habits, select a portion of said one or more traffic signs that is related to one of the reference information, a speeding behavior and the lane change to be said one or more prompt objects, and determine the prompt order such that the portion of said one or more prompt objects that is related to the reference information has a higher order than a portion of said one or more prompt objects that is related to one of the speeding behavior and the lane change; and wherein said processing unit is configured to, when the first determination result indicates that the driver is familiar with the current road section, and the second determination result indicates that the driver has good driving habits, selecting a portion of the said one or more traffic signs that is related to the reference information to be said one or more prompt objects, and determine the prompt order based on the reference information.

14. The system of claim 10, wherein the vehicle control history includes a total number of speeding violations within the predetermined recent period, and a total number of zigzag driving within the predetermined recent period;
   wherein said processing unit is configured to determine whether the total number of speeding violations exceeds a predetermined speeding violation threshold, and to determine whether the total number of zigzag driving exceeds a predetermined zigzag driving threshold;
   wherein the second determination result indicates that the driver does not have good driving habits when any one of a first determination condition and a second determination condition is true;
   wherein the first determination condition is that the total number of speeding violations exceeds the predetermined speeding violation threshold; and
   wherein the second determination condition is that the total number of zigzag driving exceeds the predetermined zigzag driving threshold.

15. The system of claim 9, wherein said processing unit is configured to determine whether the driver is familiar with the current road section further based on a current time.

16. The system of claim 15, wherein a day is divided into multiple predetermined time sections, and said processing unit is configured to determine which one of the predetermined time sections he current time corresponds to;
   wherein said processing unit is configured to determine, based on the vehicle travel route history, whether a passing-through number in said one of the predetermined time sections of a predetermined recent period has reached a predetermined passing-through threshold, where the passing-through number is a number of times the vehicle has passed through the current road section;
   wherein said processing unit is configured to generate the first determination result to indicate that the driver is familiar with the current road section upon determining that the passing-through number has reached the predetermined passing-through threshold; and
   wherein said processing unit is configured to generate the first determination result to indicate that the driver is not familiar with the current road section upon determining that the passing-through number has not reached the predetermined passing-through threshold.

* * * * *